(12) United States Patent
Becker et al.

(10) Patent No.: US 9,000,641 B2
(45) Date of Patent: Apr. 7, 2015

(54) ACTUATOR FOR ELECTRIC ADJUSTING DEVICE OF VEHICLE SEAT WITH SEVERAL ADJUSTING FUNCTIONS

(75) Inventors: Burckhard Becker, Whasung-Si, Gyunggi-Do (KR); Werner Schwanse, Whasung-Si, Gyunggi-Do (KR); Van-Toan Ho, Whasung-Si, Gyunggi-Do (KR)

(73) Assignees: Hyundai Motor Company, Seoul (KR); C. Rob. Hammerstein GmbH & Co. KG, Solingen (DE)

( * ) Notice: Subject to any disclaimer, the term of this patent is extended or adjusted under 35 U.S.C. 154(b) by 511 days.

(21) Appl. No.: 13/331,789

(22) Filed: Dec. 20, 2011

(65) Prior Publication Data
US 2012/0153755 A1    Jun. 21, 2012

(30) Foreign Application Priority Data
Dec. 21, 2010  (DE) .......................... 10 2010 063 814

(51) Int. Cl.
*H02K 7/06* (2006.01)
*H02K 7/116* (2006.01)
*B60N 2/02* (2006.01)

(52) U.S. Cl.
CPC .............. *H02K 7/116* (2013.01); *B60N 2/0296* (2013.01); *B60N 2002/0236* (2013.01)

(58) Field of Classification Search
USPC ......... 310/80, 83, 98, 99, 112, 20, 21, 29, 32, 310/37
See application file for complete search history.

(56) References Cited

U.S. PATENT DOCUMENTS

| 7,338,124 B2* | 3/2008 | McMillen | 297/284.4 |
| 7,779,728 B2* | 8/2010 | Hetrick et al. | 74/724 |
| 2004/0108146 A1* | 6/2004 | Rundell et al. | 177/144 |
| 2010/0048342 A1* | 2/2010 | Chadwick | 475/181 |

* cited by examiner

*Primary Examiner* — Dang Le
(74) *Attorney, Agent, or Firm* — Morgan, Lewis & Bockius LLP

(57) ABSTRACT

An actuator for an electric adjusting device of a vehicle seat has several adjusting functions. The actuator includes a frame, an electric drive motor disposed on the frame, having an output shaft and a pinion gear disposed on the output shaft, and rotating between a first position and a second position, a first toothed wheel disposed on the frame and engaging with a pinion gear at a first position of the drive motor, a second toothed wheel disposed on the frame and engaging with the pinion gear at a second position of the drive motor, and an adjusting unit disposed on the frame and selectively moving an electric or mechanical actuating part and a motor to the first position or the second position.

10 Claims, 4 Drawing Sheets

ACTUATOR FOR ELECTRIC ADJUSTING DEVICE OF VEHICLE SEAT WITH SEVERAL ADJUSTING FUNCTIONS

CROSS-REFERENCE TO RELATED APPLICATION

The present application claims priority to German Patent Application No. 10 2010 063 814.5 filed Dec. 21, 2010, the entire contents of which application is incorporated herein for all purposes by this reference.

BACKGROUND OF INVENTION

1. Field of Invention

The present disclosure relates to an actuator for an electric adjusting device of a vehicle seat with several adjusting functions, in which the actuator includes (a) a frame, (b) an electric drive motor disposed on the frame and having an output shaft and a pinion gear disposed on the output shaft, the electric drive motor being able to swivel between a first position and a second position, and (c) a first toothed wheel disposed on the frame and engaging with a pinion gear at the first position of the drive motor (d) a second toothed wheel disposed on the frame and engaging with the pinion gear at the second position of the electric drive motor; and an adjusting unit disposed on the frame, and selectively moving an actuating part and the drive motor between the first position and the second position.

2. Description of Related Art

In German U.M. Publication Appl. No. DE 87 16 669 U1 is known a vehicle seat with several adjusting functions that are set or adjusted with the aid of a motor. For example, the adjustment of a seat length, a seat height or inclination, a back rest, a seat depth, a head rest, etc is performed by the motor. According to the publication, an adjusting force is transferred from a single motor through a drive shaft to a switchable transfer gearbox. The transfer gearbox is provided with a switchable individual gear for each adjusting function. A drive torque of the motor may be transferred through the individual gear to an associated adjusting device. Here, a clockwise rotation, an anticlockwise rotation, and the engagement and disengagement of a clutch are controlled via the individual gear.

A vehicle seat disclosed in U.S. Pat. No. 3,222,025 A is configured so that three different seat adjusting functions are controlled independently and individually via only one electric drive motor. One of the three adjusting functions is selected via the switchable transfer gearbox and using a control switch that is not shown in the drawings. The motor can switch over in its own rotating direction, as a result of which the direction of a desired adjusting operation can be selected as intended by previously setting the rotating direction of the motor.

Generally, the vehicle seat uses an adjusting device having an individual motor for each adjusting function. However, such a situation has a drawback concerning a required number of motors. This drawback negatively affects a cost and a vehicle weight. If a plurality of drive motors is used simultaneously, the momentary consumption of power outputted from a vehicle battery may be considerably high.

The information disclosed in this Background section is only for enhancement of understanding of the general background of the invention and should not be taken as an acknowledgement or any form of suggestion that this information forms the prior art already known to a person skilled in the art.

BRIEF SUMMARY

The present invention has been made in an effort to solve the above-described problems associated with prior art. Various aspects of the present invention improve and implement an actuator for an electric adjusting device of a vehicle seat until only one electric drive motor is needed for a few, for example, two adjusting devices. In other words, the present invention is not intended to provide a single motor for all adjusting devices, is not intended to operate all adjusting devices of the seat with a single motor, and is intended to achieve one interim solution.

In one aspect, the present invention provides an actuator for an electric adjusting device of a vehicle seat with several adjusting functions, the actuator comprising (a) a frame, (b) an electric drive motor disposed on the frame and having an output shaft and a pinion gear disposed on the output shaft, the electric drive motor being rotatable between a first position and a second position, (c) a first toothed wheel disposed on the frame and engaging with a pinion gear at a first position of the drive motor, (d) a second toothed wheel disposed on the frame and engaging with the pinion gear at a second position of the drive motor, and (e) an adjusting unit disposed on the frame, and selectively moving an electric or mechanical actuating part and a motor to the first position or the second position.

In the actuator, the motor is operated, the motor moving between two or more positions. Thereby, a mechanically simple design is achieved. When the motor swivels in one plane, two adjusting devices may be actuated by one electric drive motor. If the motor swivels even horizontally relative to the plane, four or more adjusting devices may be operated. Such a configuration is advantageous in that for a switch-over process performed between two different adjusting devices, one adjusting unit requiring a much lower cost than an additional drive motor is needed. The adjusting unit may be an electric actuating part, and may be provided with one electric servo motor. However, even an electric relay or an electrically heated bimetal strip may be used as a drive device. Since a switching process between the different adjusting devices requires less work than an actual adjusting process of the adjusting device, the actuating part may keep its size small, and particularly may have much smaller power than the electric drive motor. By forming an associated electric control switch using a lever arm with a double function of both a mechanical actuating member and an electric switching member, it is possible to manually manipulate the actuating part.

The adjusting unit may be provided with an electric actuating part, particularly an electric servo motor. Mechanically formed actuating parts are designed to be operated by one user. In this case, one dead point spring may be provided on the mechanical actuating part to apply initial stress to two final positions.

One will appreciate that a combination of a control gear having one eccentric and an electric servo motor is particularly suited for the present invention. The eccentricity of the eccentric is selected such that twice eccentricity corresponds to a moving distance of the drive motor. One movable connecting link may be provided, and the eccentric may be rotatably supported in the connecting link. A motor shaft of the servo motor may be rotatably supported in a frame very near the eccentric. By the movement of the connecting link, the motor reach two positions. The connecting link may be elastically subjected to initial stress at at least one position, and in various aspects, preferably two positions. The connecting link may be curved. In this case, a central point of the curve may be placed in a swivel point or a swivel axis of the motor. The moving operation may be performed on one cylinder surface. However, the connecting link may move into one plane. For such a movement, an output shaft is advantageously moved axially relative to the connecting link. The adjusting unit may engage with the drive motor, and in various aspects, preferably a housing of the drive motor or the output shaft.

The frame fixes individual parts of an adjusting drive in an arrangement relative to each other. The frame may be formed as a housing for surrounding the parts accommodated by the frame. The housing may be at least partially surrounded by a side portion of the vehicle seat. The housing may be fixed to the side portion of the vehicle seat. The pinion gear may be implemented as a screw wheel. Each of the first and second toothed wheels may be formed as a spindle nut. A first or upper spindle may be provided to be coupled to the first spindle nut, while a second or lower spindle may be provided to be coupled to the second spindle nut. In various cases, the spindle may be present in one plane. The spindle may deviate from the plane by up to 20°. The plane may be perpendicular to the swivel axis.

The electric servo motor may have electric power smaller than that of the drive motor by at least factor 3, and in various aspects, preferably at least factor 5. It is possible to use a servo motor which is relatively smaller and is also relatively lighter. The adjusting operation may be performed with small power because it does not require an operation of a great mass.

In order to facilitate the engagement of the toothed wheels during the replacement of a position, tooth flanks of the pinion gear and/or the two toothed wheels may be formed to be sharp. The adjustment wherein a tooth may be placed on another tooth should be avoided. In various aspects, the pinion gear may be disposed on the output shaft in such a way as to move axially. The pinion gear may be pressed to a desired position by a spring. The pinion gear may be fixed to the output shaft in such a way as to rotate integrally therewith. In the case of performing the replacement from one position to another position, the pinion gear may be slightly moved axially, thus leading to tooth engagement.

In various cases, the adjusting unit may include an elastic member in a drive path between the actuating part and the drive motor, as a result of which the drive motor is not forced to follow the movement of the actuating part, and is elastically pressed to a new position by the actuating part. In the case of performing adjustment such that a tooth is placed on another tooth, the spring may be tensioned, and the engagement of teeth may be realized when the drive motor is slightly rotated.

In order to facilitate the engagement of the pinion gear with another toothed wheel during the replacement of a position, the drive motor may be slightly rotated during the engagement.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
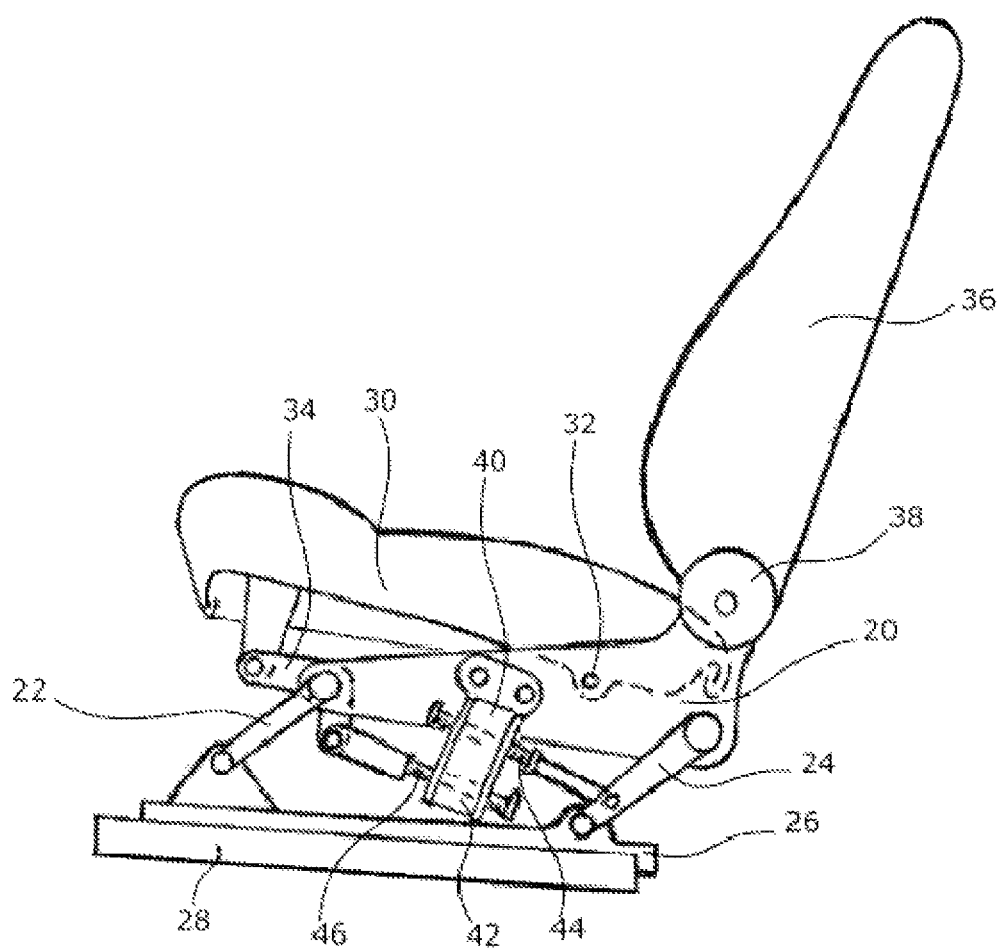
FIG. 1 is a side view showing an exemplary vehicle seat equipped with an actuator.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Applicant proposes any combination of any features of claims, partial features of claims and/or any features of the detailed description and individual sentences.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

FIG. 1 shows a vehicle seat having a conventional seat carrier 20, the seat carrier 20 being connected in an articulated manner through a front parallelogram arm 22 and a rear parallelogram arm 24 to a seat rail 26. The seat rail 26 extends to move in a longitudinal direction relative to the floor rail 28. The floor rail 28 is fixedly formed on a bottom of a vehicle. These above-mentioned portions 20 to 28 are present, respectively, such that two portions are provided per seat, in other words, one portion is provided on each seat side. Two seat carriers 20 support one seat area 30. The seat area is connected around the rear shaft 32 to the two seat carriers 20 in an articulated manner. In a front area, an L-shaped lifting arm is connected to the seat carrier 20 of at least one seat side in an articulated manner. In a detailed description, the L-shaped lifting arm swivels around an upper shaft of a front parallelogram arm 22. The front parallelogram arm 22 is connected to a support portion protruding downwards from the seat carrier 20 in an articulated manner. One back rest is disposed on the two seat carriers 20, the back rest being swivelable around a bracket 38.

Figure 2:
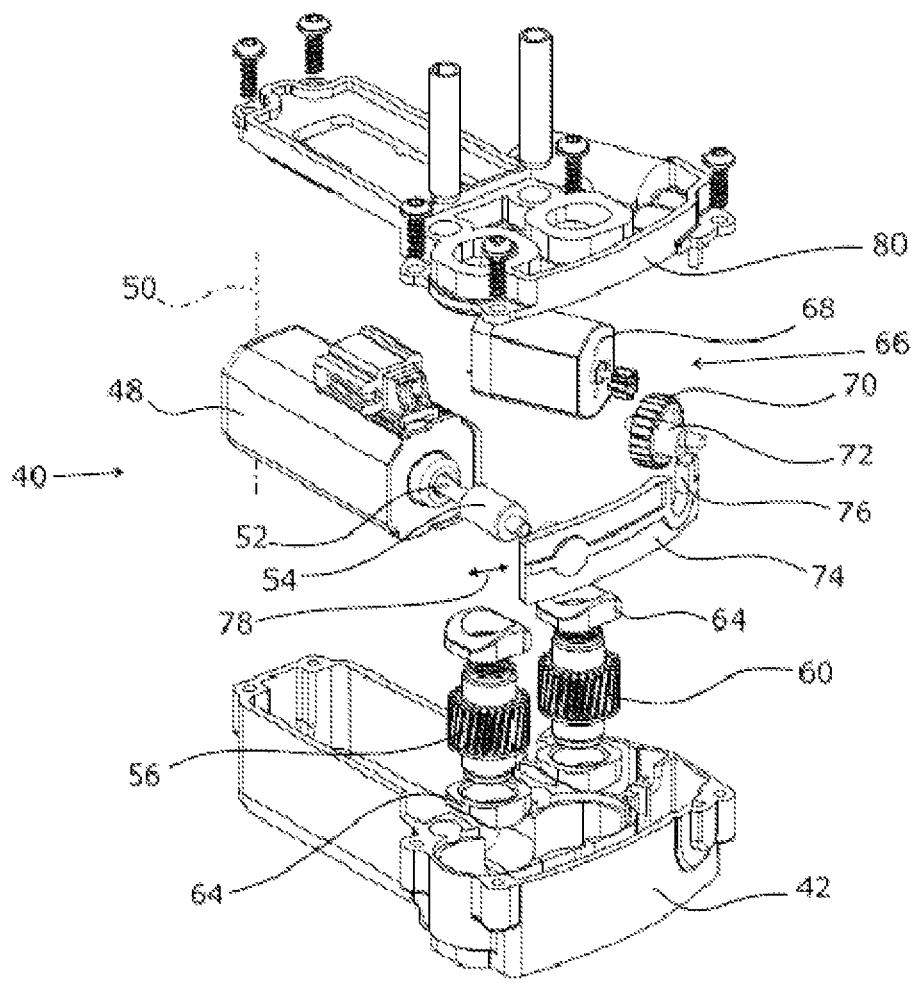
FIG. 2 is an assembled perspective view showing an exemplary actuator.
Figure 3:
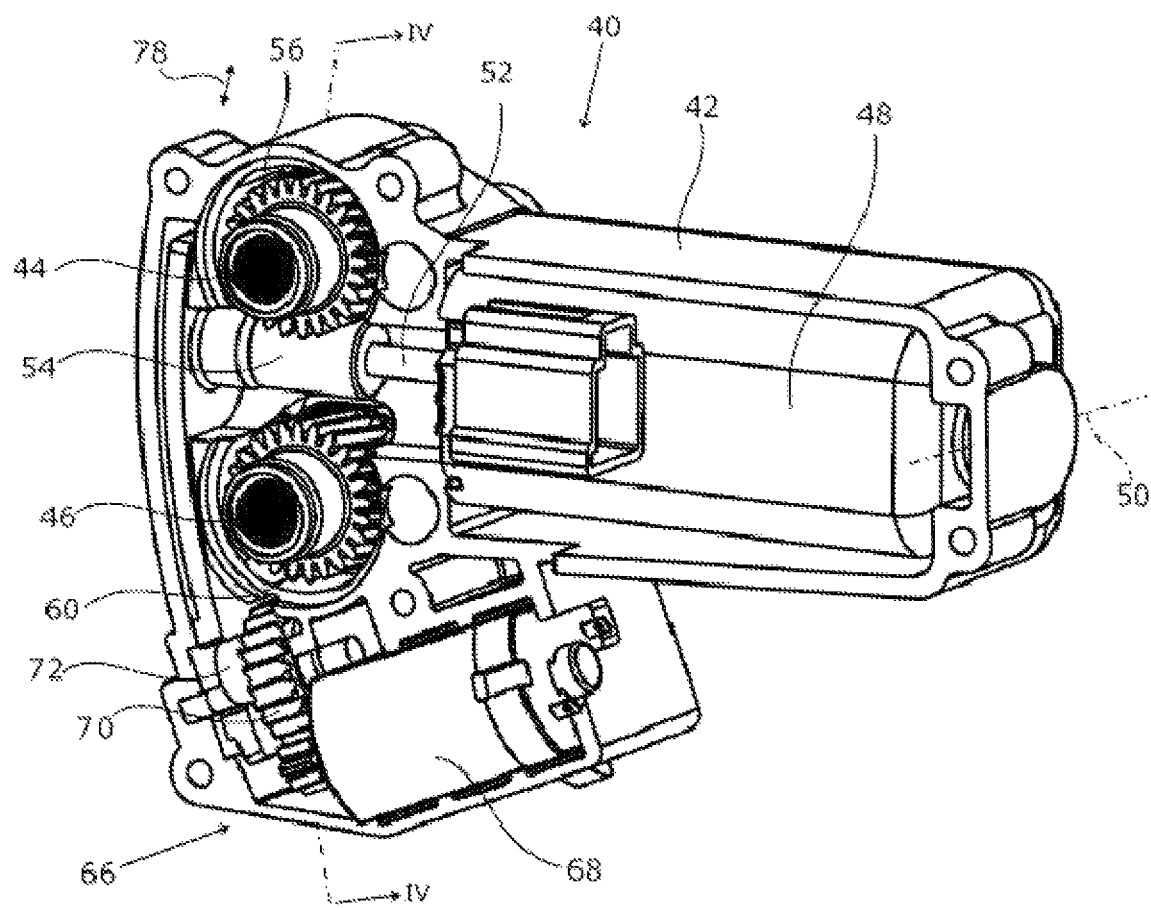
FIG. 3 is a perspective view showing the actuator of FIG. 2, when assembly is achieved but there is no cover.

An actuator 40 is fixed to at least one of the two seat carriers 20. To be more exact, a frame 42 of the actuator 40 is fixed thereto. The actuator 40 will be described in detail with reference to the accompanying drawings. FIG. 1 shows a first or upper spindle 44 that may reciprocate in its longitudinal direction. The spindle 44 is connected to the rear parallelogram arm 24 in an articulated manner, and the articulated connection is performed at a lower position corresponding to approximately ¼ of an arm length. Similarly, a second or lower spindle adjustable in its axial direction is connected to a downward portion of the lifting arm 34 in an articulated manner. A parallelogram defined by the above-mentioned portions 20 to 26 is adjusted via the upper spindle 44 associated with the actuator 40, so that it is possible to adjust a height of the seat. A height of a front edge of the seat area 30 is adjusted by a lower spindle 46. As shown in FIGS. 2 and 3, the frame 42 is implemented as a housing composed of two portions. A lower portion of the housing accommodates a drive motor 48. The drive motor 48 is swivelably supported in the housing. Such a swivelable support operation is performed around a swivel point, to be more specific, a swivel axis 50. The swivel axis is perpendicular to an axis of an output shaft 52 of the drive motor 48. For various embodiments, a swivel range of 1 to 5°, preferably 2 to 3°, and particularly about 2.5° is sufficient. In other words, only a small swivel operation is performed. The output shaft 52 supports and drives a pinion gear 54. In various embodiments, the pinion gear 54 is implemented in the form of a screw. A motor housing is present between the swivel axis 50 and the pinion gear 54. The swivel axis 50 abuts directly on an end of the housing.

The drive motor 48 may rotate between a first position and a second position shown in FIG. 3. In the first position, the pinion gear 54 is coupled to a first toothed wheel 56, and the first toothed wheel 56 may rotate in the frame 42, and may be supported in such a way as to perform only a slight rotation. In various embodiments, the first toothed wheel 56 is formed as a spindle nut. The first toothed wheel 56 is coupled to the first spindle 44.

Figure 4:
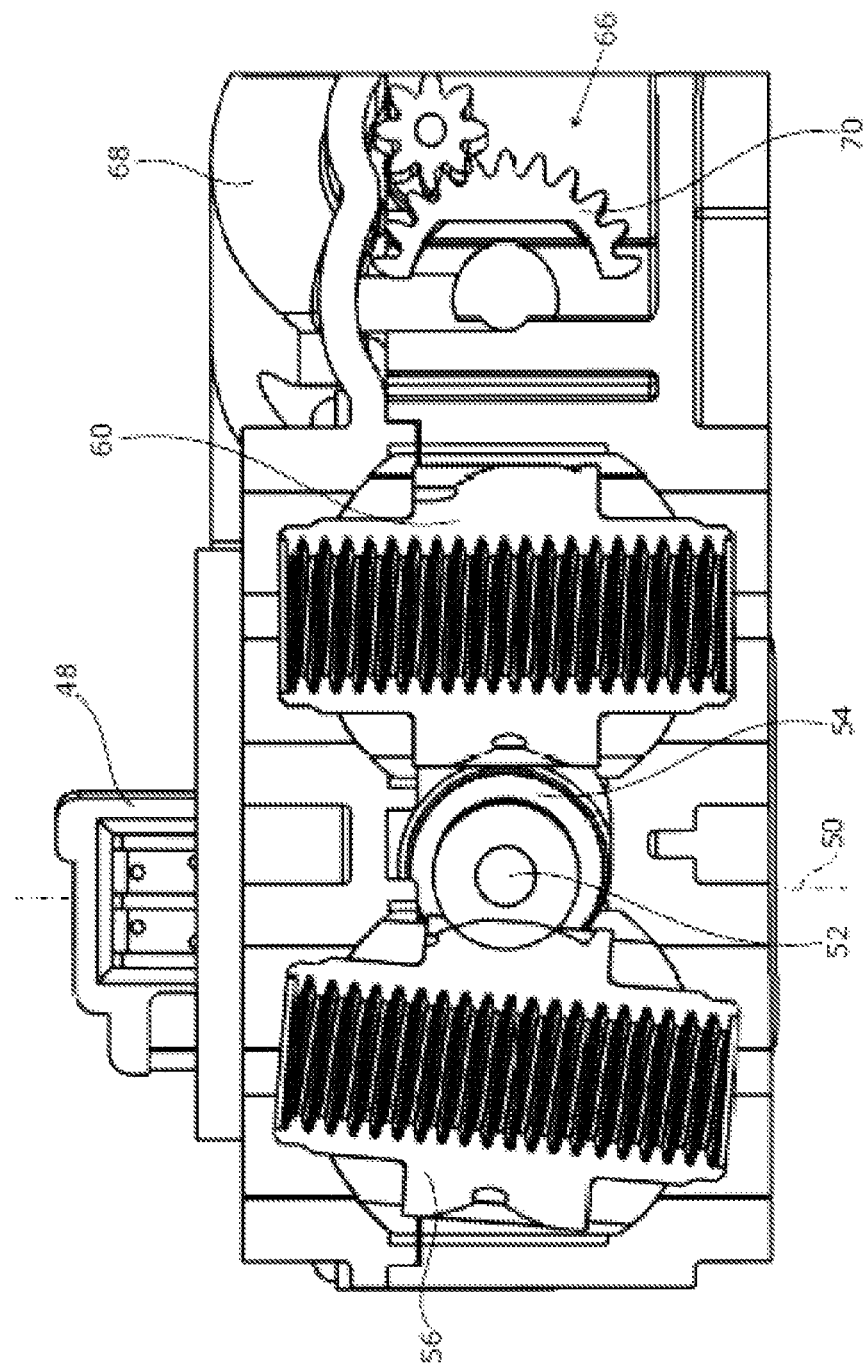
FIG. 4 is a sectional view taken along line IV-IV of FIG. 3.

A second toothed wheel 60 is rotatably and may be swivelably supported in the frame in such a way as to be structurally equal to the first toothed wheel 56. Similarly, the second toothed wheel 60 is also implemented as a spindle nut and surrounds the second spindle 46. The two spindles 44 and 46 are may be present on one plane that is perpendicular to the swivel axis 50. However, in the case where the spindles are not only rotatably supported but also is swivelable, each spindle may deviate from the plane by up to 20°. In order to enable the swiveling operation, a special bearing portion 64 is provided. The bearing portion 64 is present between the individual toothed wheel 56 or 60 and the frame 52, and its tilting movement is allowed by for example ±10°, at least ±2°. Thereby, a slanted position shown in FIG. 4 is achieved.

The swiveling operation of the drive motor 48 between the first and second positions in the frame 42 is performed by an adjusting unit 66. The adjusting unit 66 is also disposed in the frame 42. The adjusting unit 66 is provided with an electric servo motor 68. The electric servo motor 68 is considerably smaller, and occupies ¼ of a volume of the drive motor 48, preferably ⅙ thereof. The electric servo motor 68 is fixedly disposed in the frame 42, and is not movable relative to the frame 42. The electric servo motor drives a front wheel 70 via the pinion gear using its motor shaft, an eccentric 72 being allotted to the front wheel 70. One shaft protruding forwards from the front wheel 70 is supported in the frame 42.

A connecting link 74 belongs to the adjusting unit 66, and follows a curvature of a cylinder jacket. In this case, a radius is determined by an interval between the connecting link 74 and the swivel axis 50. The connecting link 74 has a bearing indentation 76, and the eccentric 72 is thus inserted into the bearing indentation 76. The rotating movement around the axis is performed in a longitudinal direction of the connecting link 74 (refer to arrow 78). A free end of the output shaft 52 is rotatably supported in the connecting link 74. As the connecting link 74 moves in the direction shown by arrow 78, the drive motor 48 swivels between its two positions. Electric connection portions for the drive motor 48 are formed such that the electric connection portions are operated together by a slight swivel angle. The electric connection parts may extend near the swivel axis 50.

Alternatively, the swivel drive may also engage with the motor housing.

In order to reduce friction during adjustment, the connecting link 74 has a raised area formed at a center of its length.

The frame is provided with a housing cover 80 receiving the bearing portion 64 at the other end of the two toothed wheels 56 and 60.

The swivel angle around the swivel axis 50 is dimensionally set as small as possible. If the pinion gear 54 is disengaged from the first toothed wheel 56 and thus does not engage with the first toothed wheel 56 any more during the replacement of a position, only a small distance of e.g. 1 to 3 mm is present until engagement between the pinion gear 54 and the second toothed wheel 60 is carried out. Therefore, a swiveling distance in an area between the two toothed wheels 56 and 60 is equal to the sum of twice a tooth depth and a small increment x of 0.5 to 5 mm, preferably about 2 to 3 mm.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An actuator for an electric adjusting device of a vehicle seat with several adjusting functions, the actuator comprising:
   a frame;
   an electric drive motor disposed on the frame and having an output shaft and a pinion gear disposed on the output shaft, the electric drive motor swiveling between a first position and a second position;
   a first toothed wheel disposed on the frame and engaging with the pinion gear at the first position of the electric drive motor;
   a second toothed wheel disposed on the frame and engaging with the pinion gear at the second position of the electric drive motor; and
   an adjusting unit disposed on the frame, and selectively moving an actuating part and the drive motor between the first position and the second position, wherein the actuating part includes a movable connecting link, and an electric servo motor coupled with a motor shaft located in an end of the movable connecting link, wherein the servo motor is configured to drive a front wheel using the motor shaft, and wherein the movable connecting link has a bearing indentation, and the front wheel has an eccentric inserted into the bearing indentation.

2. The actuator of claim 1, wherein the drive motor swivels relative to the frame about a swivel axis, and the swivel axis is positioned near an end of the frame.

3. The actuator of claim 1, wherein the frame is a housing, the housing accommodating the drive motor, the servo motor, the pinion gear, the first toothed wheel and the second toothed wheel, and the housing is at least partially surrounded by a portion of the vehicle seat.

4. The actuator of claim 1, wherein:
the pinion gear comprises a screw wheel;
the first and second toothed wheels are formed, respectively, as spindle nuts; and
a first spindle and a second spindle are provided to be coupled to the spindle nuts.

5. The actuator of claim 1, wherein the servo motor has electric power smaller than that of the drive motor by at least a factor of 3.

6. The actuator of claim 1, wherein the servo motor has electric power smaller than that of the drive motor by at least a factor of 5.

7. The actuator of claim 1, wherein the first toothed wheel and/or the second toothed wheel are swivelably disposed in the frame, a rotating movement being performed around the swivel axis at an angle less than 20° or being performed around a swivel point within a conical area having a cone angle less than 20°.

8. The actuator of claim 1, wherein the frame is disposed on a seat carrier of the vehicle seat.

9. The actuator of claim 1, wherein the electric drive motor swivels between the first and second positions at a swivel angle less than 5°.

10. The actuator of claim 1, wherein the electric drive motor swivels between the first and second positions at a swivel angle less than 3°.

* * * * *